United States Patent [19]

Thomas

[11] Patent Number: 5,030,345
[45] Date of Patent: Jul. 9, 1991

[54] NON-DRIP AND FULL PRIME FILTER

[76] Inventor: Albert E. Thomas, 7241 Enfield Ave., Reseda, Calif. 91335

[21] Appl. No.: 594,676

[22] Filed: Oct. 10, 1990

Related U.S. Application Data

[63] Continuation-in-part of Ser. No. 216,166, Jul. 7, 1988, abandoned.

[51] Int. Cl.$^5$ .................... B01D 27/10; B01D 35/153
[52] U.S. Cl. .................... 210/248; 210/349;
210/416.4; 210/416.5; 210/418; 210/430;
210/440; 210/497.1
[58] Field of Search ............... 210/232, 234, 235, 248,
210/137, 349, 416.4, 416.5, 418, 430, 431, 438,
440, 443, 493.4, 497.1, 497.2

[56] References Cited

U.S. PATENT DOCUMENTS

| | | | |
|---|---|---|---|
| 2,094,457 | 9/1937 | Lattner | 210/349 |
| 2,978,107 | 4/1961 | Gutkowski et al. | 210/235 |
| 3,071,251 | 1/1963 | Szwargulski | 210/349 |
| 3,507,391 | 4/1970 | Rosaen | 210/234 |
| 4,077,876 | 3/1978 | Southall | 210/235 |
| 4,222,875 | 9/1980 | Sikula, Jr. | 210/235 |
| 4,256,576 | 3/1981 | Rose et al. | 210/349 |
| 4,529,514 | 7/1985 | Gruett | 210/234 |
| 4,818,397 | 4/1989 | Joy | 210/234 |

FOREIGN PATENT DOCUMENTS 341085  9/1921  Fed. Rep. of Germany ...... 210/234

Primary Examiner—Robert A. Dawson
Assistant Examiner—Wanda L. Millard
Attorney, Agent, or Firm—Hadd S. Lane

[57] ABSTRACT

A filter for liquids is disclosed, which has a base with a central inlet, and an outlet, a central post with a filtering element surrounding and sealing therewith, a cannister enclosing the element and releasably sealed to the base, a passageway in the post, which is sealed to the inlet, and which has means to permit upward flow but inhibit downward flow or drip. This retains the liquid in the cannister and element when drawn upwardly, to prevent drip or spillage, or when lowered to provide a full prime. A method of removing the filtering element without drip, and a method of installing a primed element are also disclosed.

21 Claims, 4 Drawing Sheets

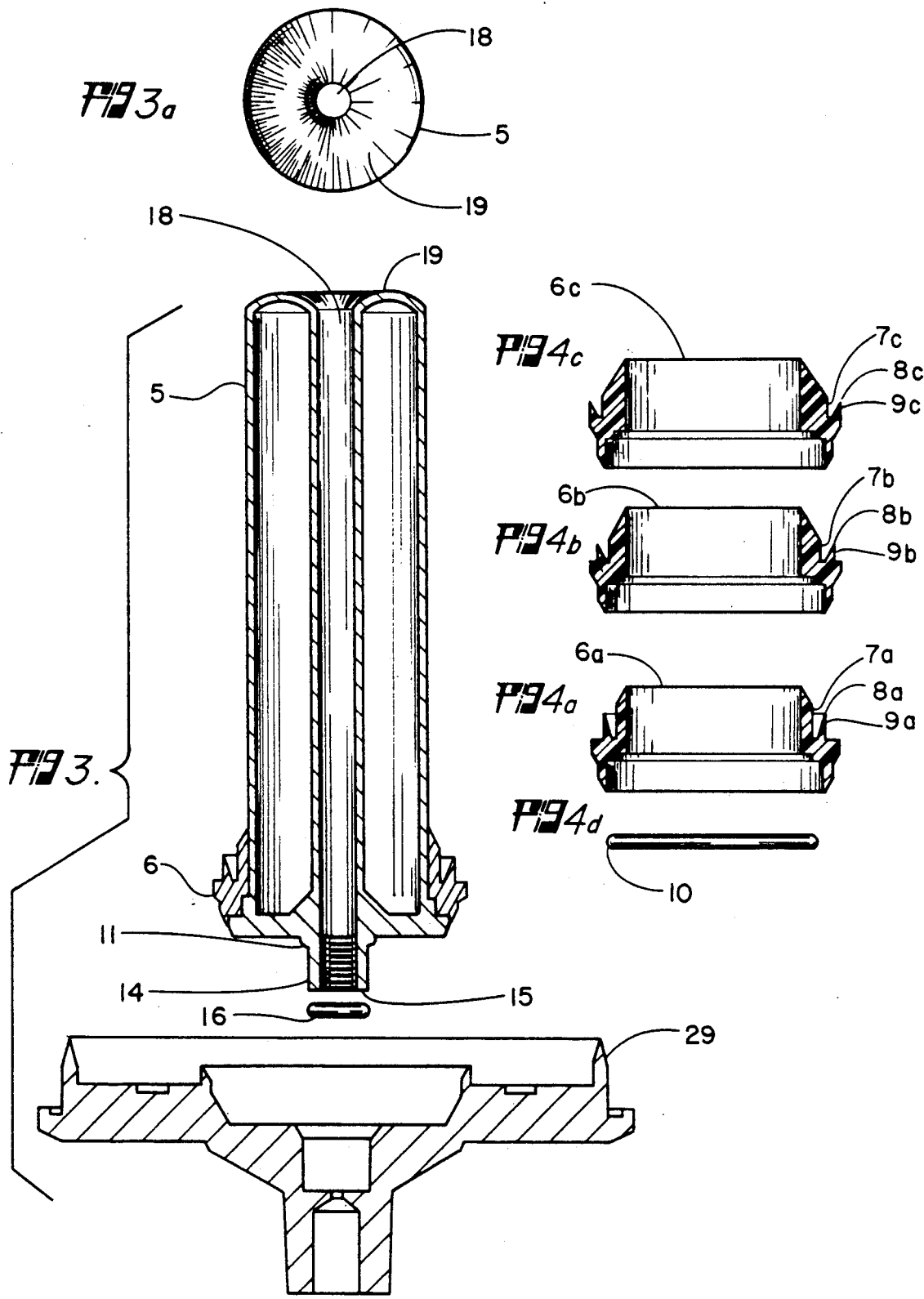

NON-DRIP AND FULL PRIME FILTER

This application is a continuation-in-part, of application Ser. No. 7/216,166, filed Jul. 7, 1988, now abandoned.

This invention relates to filters of the type generally found on an internal combustion engine, either to filter the lubricating oil, the fuel (either in the Diesel or the Otto cycle), or in the event the engine is connected to an automatic transmission, to filter the hydraulic fluid of such transmission. It relates generally to filters wherein it is desirable to remove abrasive particles of very small size from a liquid.

Specifically, it relates to filters using a roll of tissue of the type used in a bathroom, or using a roll of specially prepared paper, wherein the liquid is passed axially through said roll which is compactly contained within a confined area. U.S. Pat. No. 2,738,879 to Frantz showing such a filter, U.S. Pat. No. 3,308,956 to Yee, and U.S. Pat. No. 4,017,400 to Schade showing improvements, were quite successful, but have certain objectionable features, among which are:

1. Spillage of fluids while changing the filter element. This is both dangerous, odor producing, and messy.
2. Loss of time while changing, particularly when spillage must be cleaned up.
3. Lack of a way, before use, to prime the filter with liquid and eliminate any retention of air.
4. Adaptability to various sizes of rolls of paper difficult.

The objects of the invention are to eliminate the above mentioned objectable features, and also to provide a readily assemblable filter, and to use the fluid pressure to keep the parts in assembly and in liquid tight sealing relation with each other.

In the drawings:

FIG. 3 is a disassembled view of the filter, excluding the roll element and the cannister.

FIG. 3a is a top view of the central post on which the roll is placed.

FIGS. 4a, 4b, and 4c are sectional views of the post-to-roll adaptor, or bushing, in various sizes to fit various sizes of tissue rolls.

FIG. 4d is an edge elevation of the sealing ring between the post and any of the adaptors.

Figure 5:
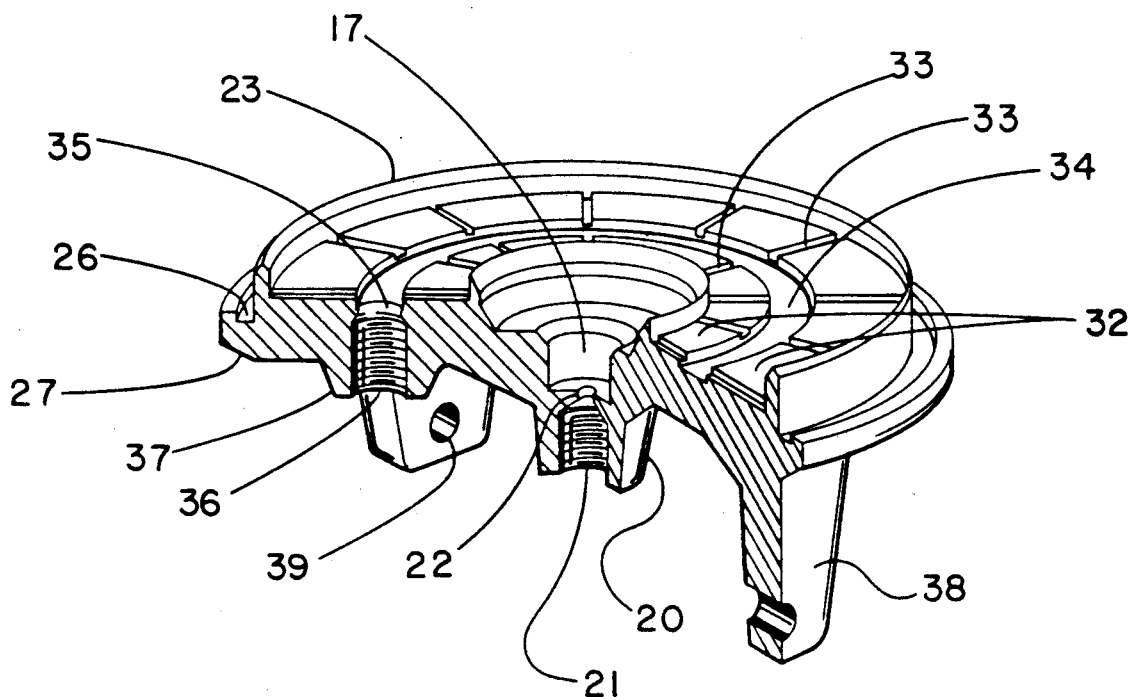

FIG. 5 is an isometric view, partly in section, of the top of the filter base.

Figure 6:
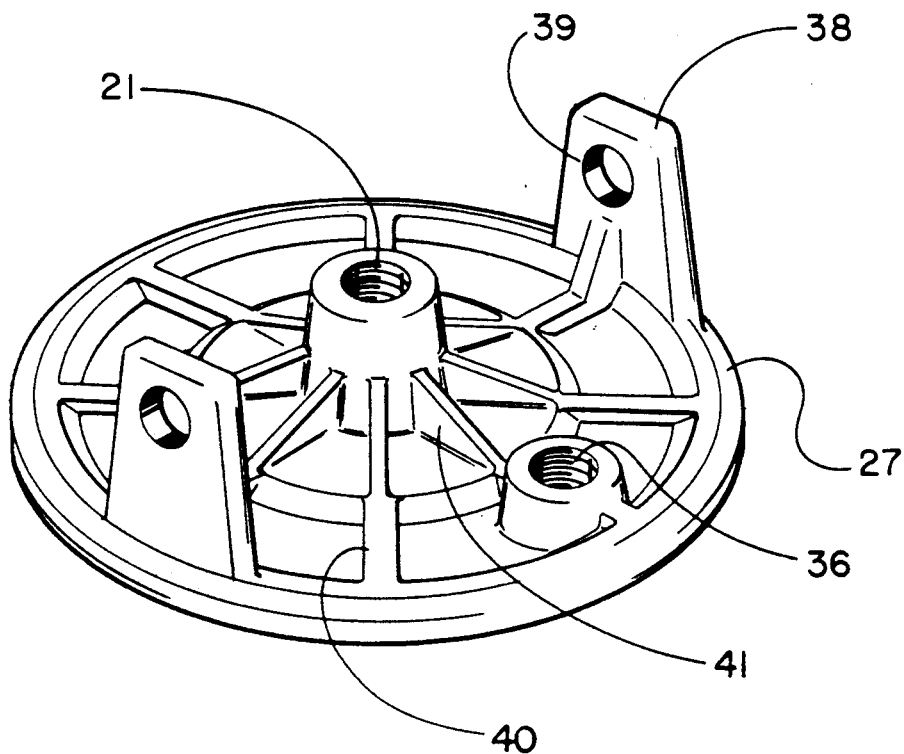

FIG. 6 is an isometric view of the bottom of the filter base.

Figure 1:
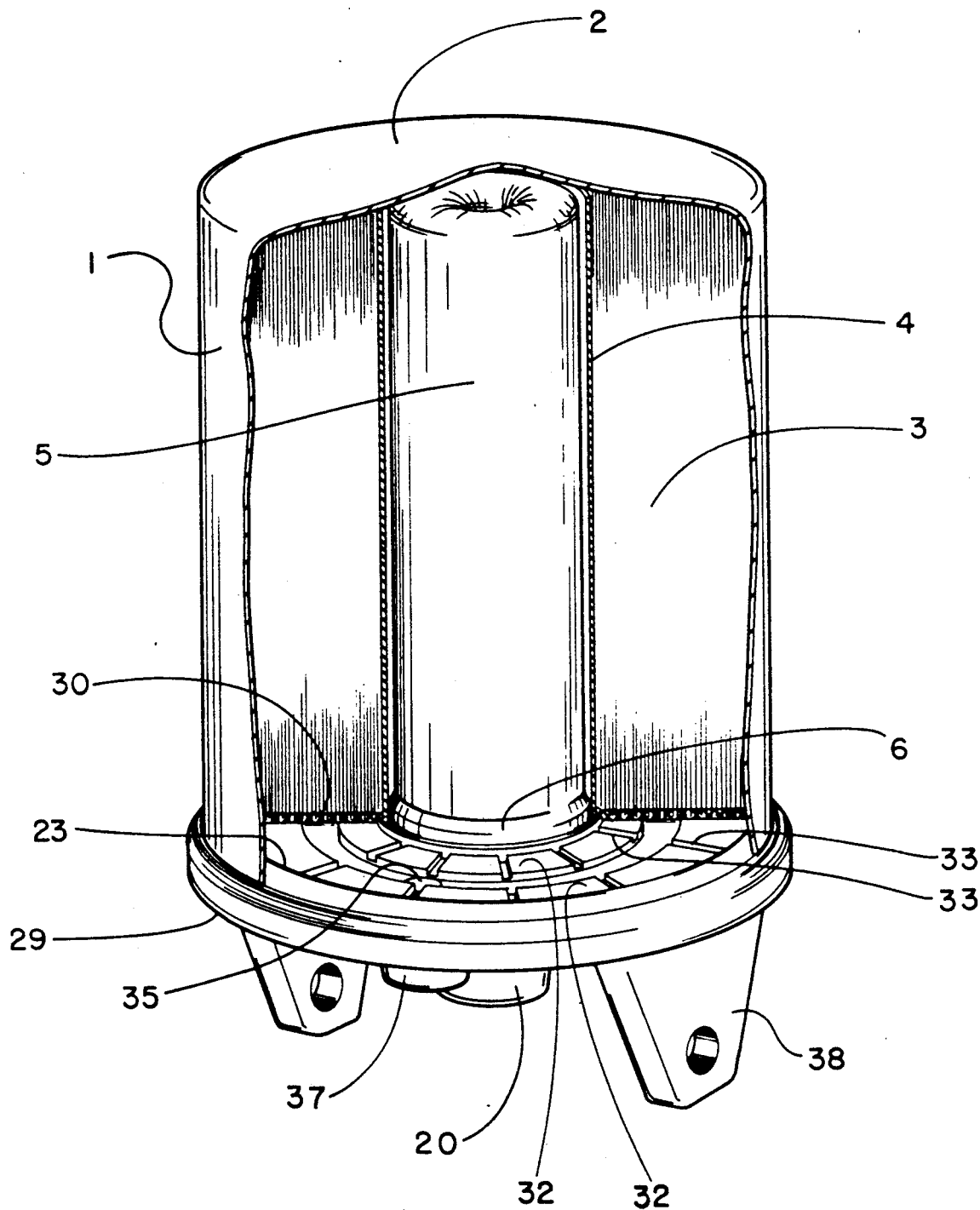
FIG. 1 is a general perspective view, partly in section, of the filter of this invention.

In the drawings, cannister 1 is domed at 2 and is sufficiently strong to resist the full oil pressure of the pump found on internal combustion engines. The filter element 3 is a roll of tissue paper of the type found in bathrooms, or it may be specially made for this filter. The roll 3 has the usual center tube 4, on which the tissue is rolled. The filter center post 5 receives the center tube 4, as shown in FIG. 1. A bushing 6 (FIG. 1) centers and seals the tube 4 as will be explained further. Filter inlet boss 20 forms the inlet for the pressurized liquid to be filtered to enter. The main base casting 29, of either metal or plastic, includes peripheral guide 23, which aids in centering the mouth of cannister 1 over the base gasket 25 during assembly of the cannister on the base during installation. The base also includes radial channels 33 and annular channels 34 to collect and pass the filtered liquid to the filter base exit boss 37 with substantially no back pressure or friction loss. The exit orifice 35 of the channel system leads to the exit boss 37. The mounting arms 38 are to be secured to a suitable support in the engine compartment.

Figure 2:
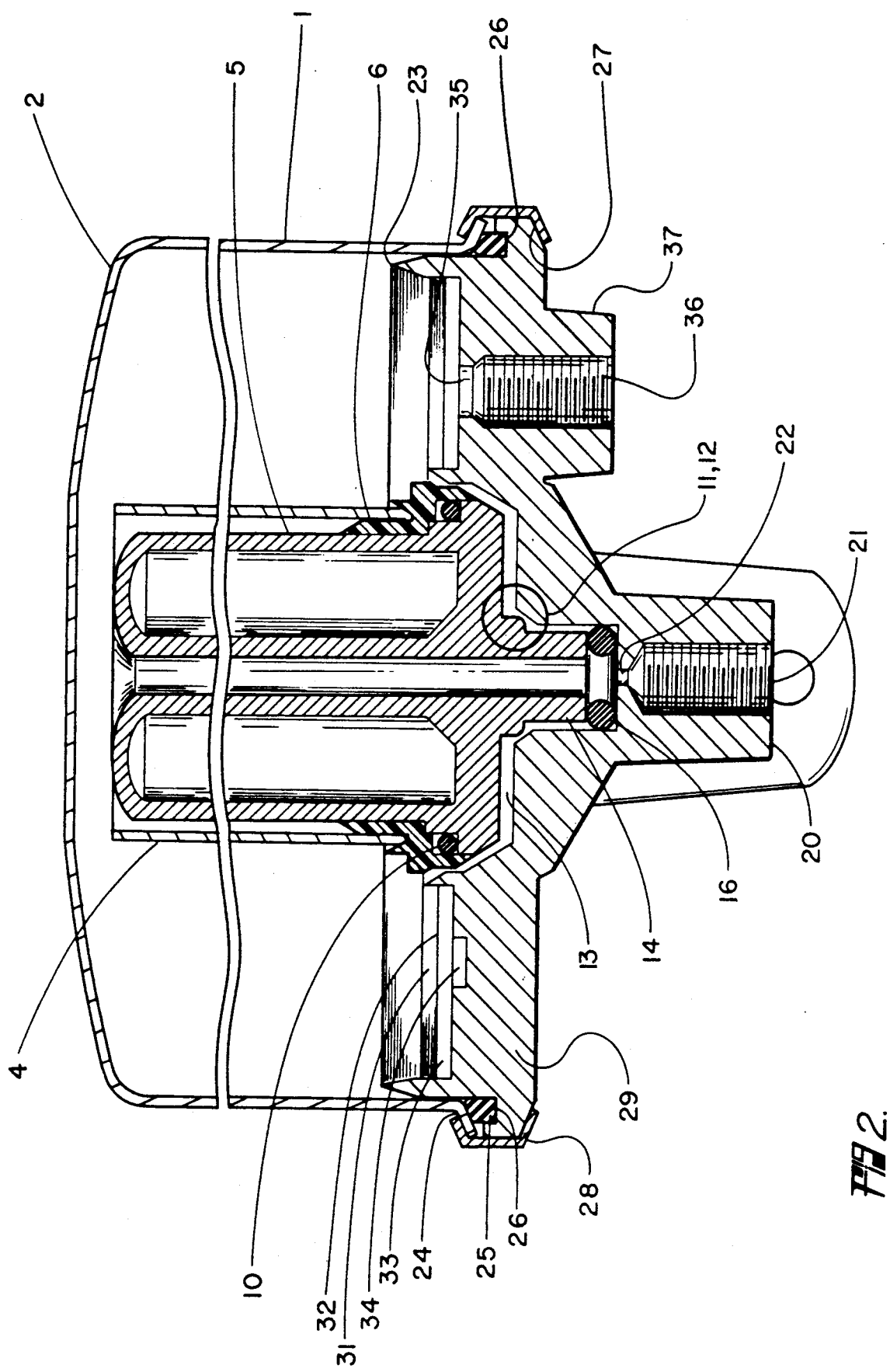
FIG. 2 is a sectional view of the assembled filter, but not showing the roll filter element.

In FIG. 2, the filter element container or cannister 1 with dome 2 are shown on a large scale. The filter center tube bushing 6 is shown assembled on the center post 5 and receiving the center tube 4 of a typical roll of toilet tissue. The sealing surface 11 on the center post 5 is shown in its relaxed or non-sealing position, but it is to be understood that the pressure of the liquid acting on the roll and the tube 5 will move the center assembly downward so that surface 11 engages and seals with surface 12 on the base 29. The center assembly also includes a lower extension 14 with a terminal surface 15 (see FIG. 3), which engages and compresses O-ring seal 16 against a surface at the bottom of casting recess 17 so that the passage 18 of the center assembly is sealed to the inlet 21 in boss 20. Surfaces 11 and 12, and also O-ring 16 constitute a double seal against leakage and by-passing the liquid from the inlet to the outlet without being filtered. Restriction 22 in the inlet is to limit the quantity of lubricating oil passing through the filter when used as a bypass lubricant filter, but will not be used when the filter is used as a full-flow fuel filter. FIG. 2 also shows cannister lip flange 24, sealing gasket 25 which seats in groove 26 so that when clamp band 28 is tightened against wedge surfaces 27 and 24, these parts are readily removable but securely held together in a sealing relationship. The recess 31 receives the screens 30 so that the filtered liquid may pass from the roll of tissue to the screens, to the channels 33 and 34 to orifice 35 and outlet 37 to which an outlet conduit is connected by threads 36.

It will be noted that in FIG. 2, the sealing bushing 6 extends upwardly a relatively short distance when compared to the distance from the base to the top 2 of the cannister 1. Above the sealing bushing 6, and between the tube 4 and the post 5 is a free space. This permits the use of a paper filtering element with any length between the bottom of the groove between surfaces 8 and 9, to the top of this sealing bushing 6 (assuming all parts fully assembled) and the distance between this groove and the top 2 of the cannister 1.

It will be further noted that even though sealing bushing 6 extends upwardly a relatively short distance, the post 5, preferably, continues upwardly to a position adjacent the dome 2. This additional height provides a filler volume, which reduces the amount of liquid lost when the filtering element is removed, and also that required to prime when the new filter element is installed.

The filtering element itself may be a roll of tissue paper as is used in toilet rooms. However, it is preferable that the roll be specially furnished for the purpose of filtering. It will then be somewhat harder paper, and more tightly rolled. In all cases, this roll will retain the liquid, with no flow, by capillary action when there is no appreciable liquid pressure, but will readily pass liquid while filtering under pressure usually found in the pump-actuated lubrication systems of the machines using this filter.

In practice, the installer preferably will select a filter of a length so that it extends upwardly to a position close to the dome 2 of the cannister, as shown in the drawings.

FIGS. 2 and 3 also show the passageway as extending upwardly, from its inlet into communication with the region above the level of the sealing bushing 6; the passageway 18 herein shown in its preferred form as being coaxial with and extending to the top of the post 5.

It is anticipated that the filtering apparatus of this invention will be sold in automobile, tractor, truck, etc., supply stores. The primary package will be the apparatus without a mounting bracket, fittings, conduits, or filtering element. The bracket will be separately purchased by the user, usually from the same store, and will be attached to a stationary support adjacent the machine to be serviced so that the filter may be secured by bolts, passing through holes 39 of the filter base (FIG. 5) and corresponding holes in the arms of the bracket so that the base 29 is horizontal. The necessary fittings and hoses will also be separately purchased, as required.

The filtering element will also be separately purchased, usually by case lots, as availability dictates. Since the filtering apparatus is adaptable to any length of filter element inherently, is adaptable to any commercial inner diameter size by the use of a selected bushing 6, and to any outer diameter by adding or removing layers of tissue, the filtering apparatus is completely adaptable to virtually any commercial filtering element found on the market.

In FIGS. 3 and 3a, the center post 5 is shown separately. This post is made of plastic and includes the central axial passageway 18. The post has an annular hollow space, as shown, and is preferably made in two pieces and sonic welded into a single unit as shown. The passage 18 extends through the extension 14 and the main body of 5, and is relatively small in diameter, as shown. The bushing 6 adapts and seals both the inside and outside of the filter element center tube (also see FIG. 2) so that there will be no leakage of unfiltered, high pressure liquid between the element center tube and the filter post assembly. A guide 8 will assist in the centering of the element tube 4 on the center post in case of an out-of-round tube, or a slightly over-sized tube. This adds to convenience in assembly of the tube on the post, and also provides an additional safety feature. The vertical bushing friction surface 9 will be pressed against laterally by the adjacent element media due to the axial compression of the element roll 3 under pressure, providing sufficient friction so that when cannister 1 is raised at the time of element change, the entire assembly of center post, filter element and cannister will be removed as a unit. This feature is important to maintain cleanliness during changing.

The body 29 has an upstanding, peripheral ledge 23 which has a sharpened upper edge. This ledge, with the body, forms a cup which will hold a modicum of drippage from the post and element as they are removed upwardly. The upper edge also enters the bottom of the outer layers of the element, causing a bottom compression of the element to restrict the flow, and also to increase the friction of the cannister 1 with the element. This, with the seals 6, insures that when a mechanic raises the cannister 1, the element 3 and post 5 will raise also and not separate.

FIGS. 4a, 4b and 4c show the bushing 6 in varying sizes to fit varying sizes of center tubes 4 as obtained in the market, the size of the post opening remaining constant. An O-ring seal 10 is shown in FIG. 4d (also FIG. 2). This seal tightly fits between the filter post 5 and the inside of the skirt of the bushing 6 (a, b, or c). This fit is such that with ordinary handling the center post bushing will not come loose from the post itself. Installation of the seal will require some force to mildly compress it, and also to remove it from the post. This seal 10 performs two duties:

1. retains the bushing 6 to the post 5
2. prevents fluids from passing between the inside surface of bushing 6 and the outside of post 5.

FIG. 3 also shows the center post mechanical seal surface 11 (which cooperates with surface 12), the center post extension 14, the sealing tip 15 of extension 14, the O-ring seal 16 (which fits into its recess in base 29 as shown in FIG. 2) and the filter base casting 29, all ready for assembly.

In FIG. 5, the recess 17 for the extension 14 is shown centrally. The inlet boss 20 is threaded at 21 to receive the inlet pressure fitting. The filter base inlet orifice 22 is made to a specific size to limit the lubricating oil to a desired volume at the pressure delivered by the oil pump. When used for liquid fuel filtration, this orifice is opened up to the full size of the inlet passage in boss 20, so as to minimize the pressure loss in the filter. Reference numeral 23 is the peripheral base guide for the cannister 1; 26 the filter base sealing gasket grooves; 27 the filter base clamp band peripheral wedge surface; 32—32 are the recess plane surfaces to receive the filter element facing screens. 30 (FIG. 1). 33—33 are the radial collector channels receiving fluid from the screens; 34 is the annular collector channel leading to outlet opening 35 and threaded opening 36 in exit boss 37. Base mounting arms 38 have apertures 39 to receive mounting bolts (not shown).

FIG. 6 is an isometric bottom view of the filter base and shows the threaded inlet 21, filter base clamp band peripheral wedge surface 27, threaded exit orifice 36, filter base mounting arms 38 with bolt holes 38, base reinforcing fin 40, and inlet reinforcing fins 41.

OPERATION AND PERFORMANCE

When used as an engine lubricant filter, the liquid, under lubricant pump pressure, enters the filter base at threaded inlet 21. The orifice 22 is relatively small to reduce the liquid impact pressure during engine start up, and not to overload the collector channels 33-34 so that the pressure therein will be near zero. Also the lubricant return line should offer no substantial resistance to flow. When used as a fuel filter, orifice 22 is not used and the passage is unobstructed so as not to reduce the fuel pressure any substantial amount.

When installing the filter element for the first time, the mechanic places the ring 10 in its groove on the post. He then holds one of the bushings 6a, 6b or 6c against the end of roll tube 4 to test for proper fit. He selects the bushing in which there is a tight fit in the groove between guide surface 7 and the inside of the tube 4. It is important that there be no leakage, and that there is a substantial frictional engagement between tube 4 and surface 7. The guide 8 assists in centering tube 4 while assembling and also provides additional sealing and frictional engagement between the tube 4 and and bushing 6. He then forces the bushing over the post 5 and over the ring 10 into seating relationship. He then forces the roll 3 axially into the cannister 1. This should be a snug fit, neither too tight or too loose. Next he places the roll and cannister over the post 5 and pushes them together. The tube 4 will be guided into full engagement with surfaces 7 and 8 so that there will be a proper seal and also a frictional engagement. This sub-assembly will hold together because of the friction between the elements as mentioned above. He then places the screens 30 and the O-ring 16 in their respective recesses. The sub-assembly is then placed over the base 29, the extension 14 entering its recess and contacting ring 16 at end surface 15. The outer layers of the roll 3 will be compressed by guide 23 sufficiently to restrict the by-passing of any fluid around the element roll 3, assuring maximum filtration levels. The clamp band 38 is then applied to flanges 24 and 27 to compress gasket 25 into sealing relationship with the base and cannister. It should be noted that the sub-assembly 1, 2, 3, 4, 5, 6, 14 etc., is not yet fully seated, that sealing surfaces 11 and 12 are not in contact and that O-ring 16 is not fully compressed. The system of screens 30, channels 33 and 34, and outlet 36 insures that there will be near zero pressure beneath the roll. Hence the downward pump pressure of the liquid on the top of post area 19 of post 5 will be substantially greater than the upward pump pressure of the liquid on the tip of area 15 of post extension 14, thereby forceing seal areas 11 and 12 together and compressing seal ring 16, effecting a dual sealing means. High pressure liquid at inlet 21 cannot by-pass anywhere to outlet 36 and avoid filtration.

Assuming the filter is mounted in the engine compartment and the oil lines installed, the filter is now fully operative. The oil passes upwardly through passageway 18 to the space below dome 2, thence axially through the roll 3 where the oil is filtered, through the screens and channels to the outlet. The screens 30 afford an abutment surface that is resistant to the compression of roll 3 into the radial or annular channel(s) and allows for the free flow of filtered liquids from the butt end of element 3 to the nearest channel outlets.

The above procedure is quite satisfactory for the filtration of oil, since the inclusion of air in the returning oil is not objectionable. However, in the case of gasoline passing to a carburetor, and particularly in the case of gasoline passing to fuel injection pumps and also in the case of diesel fuel passing to the diesel injection pumps, it is essential that the filter be fully primed so that fuel only and no air pass to the filter outlet and to the engine. Such air could stop the engine and render re-starting very difficult. The filter of this invention includes means to prime, or fill the filter with liquid with the virtual exclusion of all air, prior to use.

When used as a fuel filter, the restriction 22 is enlarged to full passageway dimension. The filter element 3 should be of medium hardness and of soft fiber content to allow for the least amount of restriction to the flow of fuel and also effectively filter the fuel aupply. The mechanic will insert a new element 3 into the cannister 1 and invert the cannister so that dome 2 rests on a flat surface. Using the same kind of fuel to be filtered, he will then pour some into the center tube 4 until the fuel saturates the element roll and fills the tube 4. He should then pour off about 2 inches of fuel, and slowly insert the complete center post assembly 5, 6 and 10 into the element center tube 4 and firmly seat the end of this tube in the bushing 6. This will leave the filter element 3, the dome 2 and the passageway 18 full (or slightly over full) of fuel. The screens 30 and the ring 16 will be in place and fuel in the base will remain at the level existing at time of change. When ready to install the complete cannister assembly of 1, 3, 4, 5, 6 and 10, he will quickly pour off the excess fuel on top of the filter element, immediately invert the cannister assembly, and seat it over the base 29, and install clamp band 28. There will be no fuel escape from channel 18 at opening 15 if properly done. This leaves the entire filter full of fuel, with no air, ready for smooth starting and continued running of the engine.

At the time of changing the element 3 of this filter, in either the fuel or the lubricant embodiment, this function can be done with no spillage of the liquid beyond the confine of the filter itself. This results in avoiding the fire danger and also the mess caused by such spillage. This is an important feature of the filter of this invention.

Recalling that the tight fit of the tube 4 into the space between surfaces 7 and 8 of the bushing 6 creates a substantial frictional joining of these parts, that the ring 10 contributes to the substantial frictional joining of the bushing 6 and the post 5, and that the roll 3 is in snug frictional engagement with the cannister 1, it is obvious that when the band 28 is removed, the entire assembly of parts 1, 2, 3, 4, 5 and 6 (including 14) can be raised as a unit, the parts being held together by friction. Hence no liquid in the base will escape. Since the space in dome 2 is not vented, no liquid can escape through the relatively small (e.g., ¼ inch diameter) passageway 18, and there will be no substantial drip from this source. Atmospheric pressure holds the entire liquid column in passage 18 stationary. Capillary attraction holds the liquid to and in the body of element 3. There may be a slight drip of a few drops from the various parts at first separation of these main assemblies, but these drops will fall harmlessly into the base 29 which has ample space to receive them. The mechanic may then carefully invert the removed assembly with not a single drop of fluid escaping to create even a small mess. He may then transport the assembly to a tray where he may remove the old element 3, clean the entire assembly and install a new element as explained previously.

In summary, the main advantages of this filter are:

1. A changeable element filter in which there is no spillage either during the installation of the new element or the removal of the old element.

2. A changeable element filter in which the filter can be fully primed with liquid when the element is installed.

3. Free or face to face sealing between the filter center post filter element, and the filter base. This allows the filter cannister, filter element and center post to have no frictional engagement with the base, which allows the upper assembly to be lifted off the base with no frictional resistance, so that the non-spillage and the full-prime features are possible.

4. A series of sizes of center post adaptor bushings to permit the use of any of a number of paper elements whose center tubes are of differing diameter.

5. The filter is inherently adaptable to filtering element of any length, within limits.

I claim:

1. A filter for liquids comprising a base, a central liquid inlet in said base, a post with a filtering element surrounding and sealing therewith, a longitudinally extending passageway defined in said post, said post releasably sealed to said inlet, and said passageway extending upwardly into communication with a region above the level of the filtering element and post sealing, an outlet in the base, an area of low pressure beneath said filtering element receiving filtered liquid and communicating with said outlet, a cannister enclosing and sealed to said filtering element, readily releasable means to seal said cannister to said base, said passageway constructed to permit upward flow but inhibit downward flow or drippage of said liquid therefrom, said filtering element being of the type which retains said liquid by capillary action, whereby said cannister, filtering element, post and contained liquid may, when the means to seal the cannister to the base is released, be drawn upwardly into, or moved downwardly into said base, with no loss of contained liquid and no substantial drip, which if present as a few drops, will fall into and be received by said base to avoid any external mess due to spillage of the liquid, and also retain the liquid in said cannister to maintain a full prime.

2. The filter of claim 1 wherein said filtering element is frictionally attached to said post by a bushing, and the filtering element is provided with a central tube with a bottom edge, said bushing having a central bore tightly gripping said post, and an upstanding groove on the periphery of said bushing to receive and seal the bottom edge of said tube.

3. The filter of claim 2 wherein said filter is supplied with a plurality of bushings of the same central bore, each having a groove of a diameter equaling that of one of a central tube supplied by various markets, whereby a mechanic may select a bushing with a proper fit for the tube of any of said various filtering elements.

4. The filter of claim 2 wherein there is an additional O-ring (10) between the bushing and the central tube to further enhance the sealing and the frictional engagement of the bushing and post.

5. The filter of claim 1 wherein sealing elements comprise an extension having a tip on said post which projects into a recess in said base, and a sealing ring at the bottom of said recess axially engaging the tip of said extension.

6. The filter of claim 5 wherein said base includes a further sealing surface (12), and said post includes a sealing surface mating therewith.

7. The filter of claim 1 wherein said base comprises a series of channels receiving the filtered liquid, said channels communicating with said outlet.

8. The filter of claim 7 wherein there are screens below said filtering element which support said filtering element and transmit the liquid to the channels.

9. The filter of claim 1 wherein said base has an upstanding ledge to form a cup-like area to provide a large volume to receive drippage, to provide a guide for said cannister installation and simultaneously compress an outer surface of the filtering element to prohibit by-pass of fluids around the filtering element.

10. The filter of claim 1 wherein said passageway is sealed to said inlet by longitudinally engaging sealing elements.

11. The filter of claim 1 wherein the cannister is sealed to said filtering element with a sliding contact, whereby when the cannister is pressurized liquid is admitted through said inlet, and the post and filtering element may move longitudinally to engage sealing means to prevent said liquid from by-passing from said inlet to said outlet.

12. The filter of claim 1 wherein the passageway is constructed to have a relatively small size such that the liquid in the passageway and upper part of the cannister is retained by atmospheric pressure.

13. A method of removing a top of a filter from its base, said top comprising a central post, a filtering element surrounding, sealed to and engaging said post, an enclosing cannister surrounding, sealed to, and engaging said filtering element, said post having an axial bore, said post is sealed to the filter inlet thereby aligning said bore and said bore constructed to permit upward flow when preventing downward flow of liquid therethrough; the step of lifting the assembly of cannister, elements and post upwardly, as a unit, retaining the upper part of the cannister by said means associated with said bore, retaining the body of liquid in the filtering element by capillary action and retaining the liquid in the other parts by adhesion, permitting any incidential drip to fall into, but not escape from, the base, and then remove the unit entirely, to thus disassemble the filter with no mess due to spillage of said liquid.

14. The method of claim 13 wherein a mechanic will block a lower end of the bore to prevent further accidental drip.

15. The method of claim 13 wherein said assembly is inverted after lifting but before removal from the region of said base, to prevent further drip.

16. The method of claim 13 wherein the bore is constructed to have a relatively small size such that the liquid in the bore and upper part of the cannister is retained therein by atmospheric pressure.

17. The method of assembling and full-priming a liquid filter, with no spillage, comprising the steps of mounting a cylindrical filtering element having a central bore a post extending through said bore, said post being sealed and secured in said bore, said post having an axial passageway therethrough, and said passageway is constructed so as to permit upward flow but to prevent preventing downward flow of liquid, placing this sub-assembly in a cannister, filling said cannister and saturating said filtering element with a compatable liquid, holding the assembly of post, filtering element and cannister over and facing a base defining a cup-like shape containing a quantity of said liquid, holding the liquid in the passageway and upper part of the cannister by said passageway construction, holding the liquid in the filtering element by capillary attraction, lowering the assembly onto the base to where the assembly meets the liquid in the base, and sealingly securing the assembly to the base.

18. The method of claim 17 wherein there is a recess in said base, and an extension on said post, the further step of first placing the extension in the liquid in the recess to raise the level of the liquid in the base to that of the filtering element when the assembly is secured.

19. The method of claim 17 wherein said passageway is constructed to have a relatively small size such that the liquid in the passageway and upper part of the cannister is retained therein by atmospheric pressure.

20. In a filter for liquids which utilizes a filtering element that passes liquid to be filtered under substantial pressure but retains the liquid under inappreciable pressure, the improvement comprising a base, a central liquid inlet therein, a post adapted to have said filtering element surrounding and sealed therewith, a longitudinally extending passageway in said post, said post releasably sealed to said inlet, and said passageway extending upwardly into communication with a region above the level of the filtering element, an outlet in the base, an area of low pressure beneath said filtering element adapted to receive filter liquid and communicating with said outlet, a cannister adapted to enclose and seal with said filtering element, readily releasable means to seal said cannister to said base, and said passageway is constructed to permit upward flow but inhibit downward flow or drippage of said liquid therefrom, whereby said cannister, filtering element, post and contained liquid may be drawn upwardly from, or moved downwardly into said base with no substantial loss of contained liquid to avoid any external mess due to spillage of the liquid, and also retain the liquid in said cannister to maintain a full prime.

21. The improvement of claim 20 wherein said passageway is constructed to have a relatively small size such that the liquid in the passageway and upper part of the cannister is retained by atmospheric pressure.

* * * * *